United States Patent
Richards (10) Patent No.: US 7,529,300 B2
(45) Date of Patent: May 5, 2009

(54) SHAPED-OFFSET QUADRATURE AMPLITUDE MODULATION METHODS AND APPARATUS

(75) Inventor: Wayne Edward Richards, La Mesa, CA (US)

(73) Assignee: Cubic Corporation, San Diego, CA (US)

( * ) Notice: Subject to any disclaimer, the term of this patent is extended or adjusted under 35 U.S.C. 154(b) by 563 days.

(21) Appl. No.: 11/190,352

(22) Filed: Jul. 26, 2005

(65) Prior Publication Data

US 2007/0025465 A1    Feb. 1, 2007

(51) Int. Cl.
H04N 7/12    (2006.01)

(52) U.S. Cl. .............. 375/240.01; 340/870.18; 340/538.11; 332/106

(58) Field of Classification Search .......... 332/108; 341/51; 375/240.01, 260, 261
See application file for complete search history.

(56) References Cited

U.S. PATENT DOCUMENTS

| | | | |
|---|---|---|---|
| 4,529,950 A * | 7/1985 | Chazenfus et al. .......... 332/108 |
| 4,730,344 A | 3/1988 | Saha |
| 5,253,271 A | 10/1993 | Montgomery |
| 5,351,016 A | 9/1994 | Dent |
| 5,945,931 A | 8/1999 | Tahara |
| 5,945,932 A * | 8/1999 | Smith et al. .................. 341/51 |
| 6,240,142 B1 * | 5/2001 | Kaufman et al. ............ 375/261 |
| 6,606,010 B1 | 8/2003 | Poklemba et al. |
| 6,693,970 B2 | 2/2004 | Vankka |
| 2001/0001008 A1 | 5/2001 | Dent |
| 2002/0085118 A1 | 7/2002 | Harris et al. |
| 2003/0141938 A1 | 7/2003 | Poklemba et al. |
| 2004/0047430 A1 | 3/2004 | McCarty, Jr. |
| 2004/0062191 A1 | 4/2004 | Lecroix-Penther et al. |
| 2004/0086027 A1 | 5/2004 | Shattil |
| 2004/0141548 A1 | 7/2004 | Shattil |
| 2004/0165681 A1 | 8/2004 | Mohan |
| 2004/0174928 A1 | 9/2004 | Siwiak et al. |
| 2004/0252775 A1 * | 12/2004 | Park ......................... 375/260 |
| 2004/0252781 A1 | 12/2004 | Park |
| 2005/0025041 A1 | 2/2005 | Marsili |

* cited by examiner

*Primary Examiner*—David C Payne
*Assistant Examiner*—Adolf Dsouza
(74) *Attorney, Agent, or Firm*—Townsend and Townsend and Crew (57) ABSTRACT

Shaped Offset Quadrature Amplitude Modulation (QAM) can be implemented within a communication system. A train or sequence of orthogonal sinc pulses can be generated for each of the in-phase and quadrature signal paths. The sinc pulses in the quadrature signal path can have a predetermined time offset relative to the pulses in the in-phase signal path. An in-phase or quadrature antipodal data signal can be used to modulate the respective sinc pulse train. Each of the in-phase and quadrature pulses can be shaped using a time domain windowing function, such as a Kaiser-Bessel window, to adjust the spectral width and spectral sidelobe level of the signal. The beta parameter of the window can be adjusted to achieve the desired signal response. The timing of the sinc pulses may need to be adjusted following the window function in order to maintain orthogonality of the pulses.

25 Claims, 5 Drawing Sheets

SHAPED-OFFSET QUADRATURE AMPLITUDE MODULATION METHODS AND APPARATUS

BACKGROUND OF THE INVENTION

Electronic communication systems continually strive to communicate information in a reliable and efficient manner. The amount of information that can be communicated over a given bandwidth in the presence of noise is bounded by the Shannon limit. Most communication system utilize coding and modulation schemes that do not come close to approaching the Shannon limit.

A communication system may tradeoff complexity for efficiency. The communication systems that utilize encoding schemes that more closely approach the Shannon limit typically require more signal processing compared to communication systems implementing simpler encoding schemes.

A communication system designer typically examines a number of factors when selecting the type of encoding and modulation used within a system. Ideally, the communication system will be robust and offer satisfactory performance over various operating conditions. Other factors, such as spectral efficiency and spectral occupancy may need to be constrained in order to meet system requirements.

It is desirable to have a communication system that is spectrally efficient in order to maximize the amount of information that is communicated. Additionally, it is desirable to implement an energy efficient waveform, such that the amount of signal required to achieve a prescribed performance level can be minimized.

BRIEF SUMMARY OF THE INVENTION

Shaped Offset Quadrature Amplitude Modulation (SO-QAM) can be implemented within a communication system. A train or sequence of orthogonal sinc pulses can be generated for each of the in-phase and quadrature signal paths. The sinc pulses in the quadrature signal path can have a predetermined time offset relative to the pulses in the in-phase signal path. An in-phase or quadrature antipodal data signal can be used to modulate the respective sinc pulse train or sequence. Each of the in-phase and quadrature pulses can be shaped using a windowing function, such as a Kaiser-Bessel window, to adjust the spectral width and spectral sidelobe level of the signal. The beta parameter and length of the window can be adjusted to achieve the desired signal response. The timing or periodicity of the sinc pulses may need to be adjusted following the window function in order to maintain orthogonality of the pulses.

The disclosed embodiments include a method of modulating data that includes generating a first sinc pulse sequence, generating a second sinc pulse sequence time offset from the first sinc pulse sequence by a predetermined time offset, multiplying each sinc pulse in the first sinc pulse sequence by a first windowing function to generate a first truncated sinc pulse sequence, multiplying each sinc pulse in the second sinc pulse sequence by a second windowing function to generate a second truncated sinc pulse sequence, modulating the first truncated sinc pulse sequence with in-phase data, modulating the second truncated sinc pulse sequence with quadrature data, upconverting the modulated first truncated sinc pulse sequence to an operating frequency, upconverting the modulated second truncated pulse sequence to the operating frequency and substantially in quadrature to the modulated first sinc pulse sequence at the operating frequency, and combining the modulated first sinc pulse sequence at the operating frequency with the modulated second sinc pulse sequence at the operating frequency.

The disclosed embodiments include a method of modulating data that includes generating a first sinc pulse sequence, generating a second sinc pulse sequence time offset from the first sinc pulse sequence by a predetermined time offset, multiplying each sinc pulse in the first sinc pulse sequence by a Kaiser-Bessel window function to generate a first truncated sinc pulse sequence, adjusting a pulse repetition period of the first truncated sinc pulse sequence such that a center of each truncated sinc pulse occurs at substantially a null of a previous truncated sinc pulse, multiplying each sinc pulse in the second sinc pulse sequence by the Kaiser-Bessel windowing function to generate a second truncated sinc pulse sequence, adjusting a pulse repetition period of the second truncated sinc pulse sequence such that a center of each truncated sinc pulse occurs at substantially a null of a previous truncated sinc pulse, amplitude modulating the first truncated sinc pulse sequence based on in-phase data, amplitude modulating the second truncated sinc pulse sequence based on quadrature data, upconverting the modulated first truncated sinc pulse sequence to an operating frequency, upconverting the modulated second truncated pulse sequence to the operating frequency and substantially in quadrature to the modulated first sinc pulse sequence at the operating frequency, and summing the modulated first sinc pulse sequence at the operating frequency with the modulated second sinc pulse sequence at the operating frequency.

The disclosed embodiments include a method of receiving modulated data that includes receiving a composite signal having in-phase and quadrature signal components, separating the in-phase signal component from the quadrature signal component, recovering in-phase data using a first matched filter having a response matched to a truncated sinc pulse windowed by a predetermined window function, and recovering quadrature data using a second matched filter having the response matched to the truncated sinc pulse windowed by the predetermined window function.

The disclosed embodiments include an apparatus for generating a modulated signal that includes a first sinc pulse generator configured to generate a first sequence of sinc pulses, a second sinc pulse generator configured to generate a second sequence of sinc pulses, a first windowing module coupled to the first sinc pulse generator and configured to apply a first window function to the first sequence of sinc pulses to generate a first sequence of truncated sinc pulses, a second windowing module coupled to the second sinc pulse generator and configured to apply a second window function to the second sequence of sinc pulses to generate a second sequence of truncated sinc pulses, a timing module coupled to the first and second sinc pulse generators and configured to adjust a pulse repetition period between adjacent sinc pulses such that a center of a first truncated sinc pulse occurs at approximately a null of a previous truncated sinc pulse, and further configured to maintain a predetermined time offset between the first sequence of sinc pulses and the second sequence of sinc pulses, a first amplitude modulator coupled to the first windowing module and configured to amplitude modulate each truncated sinc pulse of the first sequence of truncated sinc pulses, a second amplitude modulator coupled to the second windowing module and configured to amplitude modulate each truncated sinc pulse of the second sequence of truncated sinc pulses, an upconverter coupled to the first and second amplitude modulators and configured to upconvert to a desired operating frequency the amplitude modulated first sequence of truncated sinc pulses and upconvert to the desired operating frequency, and at a predetermined phase offset relative to the first sequence of truncated sinc pulses, the amplitude modulated second sequence of truncated sinc pulses, and a signal combiner coupled to the upconverter and configured to combine the amplitude modulated first sequence of truncated sinc pulses at the desired operating frequency with the amplitude modulated second sequence of truncated sinc pulses at the desired operating frequency and predetermined phase offset relative to the first sequence of truncated sinc pulses.

The disclosed embodiments include an apparatus for receiving a modulated signal; that includes a downconverter configured to separate a received composite signal into in-phase and quadrature signal components, a first matched filter coupled to the downconverter and configured to recover in-phase data from the in-phase signal component, the first matched filter configured to provide a response based on a truncated sinc pulse multiplied by a predetermined window function, and a second matched filter coupled to the downconverter and configured to recover quadrature data from the quadrature signal component, the second matched filter configured to provide a response based on the truncated sinc pulse multiplied by the predetermined window function.

BRIEF DESCRIPTION OF THE DRAWINGS

The features, objects, and advantages of embodiments of the disclosure will become more apparent from the detailed description set forth below when taken in conjunction with the drawings, in which like elements bear like reference numerals.

DETAILED DESCRIPTION OF THE INVENTION

A spectrally efficient modulation that utilizes and energy efficient waveform is disclosed. The modulation technique implements Shaped Offset Quadrature Amplitude Modulation (SOQAM). Although described herein in terms of a quadrature signal, it will be evident how the modulation can be extended to higher order modulation.

In one embodiment, a plurality of overlapping shaped pulses are modulated on orthogonal carriers. Each of the overlapping shaped pulses can be orthogonal to other pulses by timing the pulses such that each successive pulse falls on a null of any other pulse. For example, the pulses can be implemented as sinc ((sin x)/x) pulses where the pulse period is synchronized such that the center of each successive pulse occurs at a null of any other sinc pulse.

The spectrum occupied by the pulses can be shaped by truncating the length of the pulses and applying a window function to the pulses. The length of the window function and sinc null spacing determine the spectrum of the truncated pulses. In one embodiment, the window function can be a Kaiser-Bessel window function having a predetermined length, although use of a Kaiser-Bessel window function is not a limitation. The Kaiser-Bessel window function may be advantageous because the spectrum occupied by the pulses, particularly the desired rate of spectral rolloff and sidelobe level can be adjusted by adjusting the beta value associated with the Kaiser-Bessel window function. A higher beta decreases the level of the sidelobes, but the reduction in sidelobe level comes at a cost of increased transition width.

The window function can operate to truncate the pulse length. The length of the pulse can be selected to achieve the desired spectral rolloff. Additionally, the length of the pulse can be selected based on constraints applied to a receiver that may utilize a matched filter to recover the information. Applying the window function to the pulses may change the optimal position of the adjacent truncated windowed pulses in order to maintain orthogonality. In one embodiment, the repetition period of the pulses can be adjusted to compensate for the window function in order to maintain orthogonality between successive pulses. However, changing the repetition period of the pulses can affect the data rate, where the data rate depends on the pulse repetition rate. In another embodiment, the timing of the sinc null spacing may be adjusted to maintain a desired data rate and orthogonality of the truncated pulses. Maintaining the pulse orthogonality reduces or substantially eliminates the inter-symbol interference (ISI) when a matched filter is used in the receiver and the decision point occurs at the center of the pulse.

Separate pulse trains or sequences of pulses can be utilized for in-phase (I) and quadrature (Q) signals. The pulse trains can be time offset by a predetermined value. For example, the predetermined time offset can correspond to one half of the pulse repetition period.

The data allocated to the I channel can be used to modulate the I pulse train or sequence, while data allocated to the Q channel can be used to modulate the Q pulse train or sequence. In one embodiment, the pulse can be antipodal amplitude modulated. The pulse can be multiplied by a +1 if the data bit is a one and can be multiplied by −1 if the data bit is a zero. Higher order modulation can be supported by allowing more than two states for each pulse. For example, if each pulse can be amplitude modulated by one of four amplitudes, a constellation similar to 16-QAM can be supported.

The modulated I and Q pulse trains can be upconverted to a corresponding carrier frequency and the I and Q channel can be combined into a quadrature signal. For example, the I carrier can be summed with the Q carrier.

Figure 1:
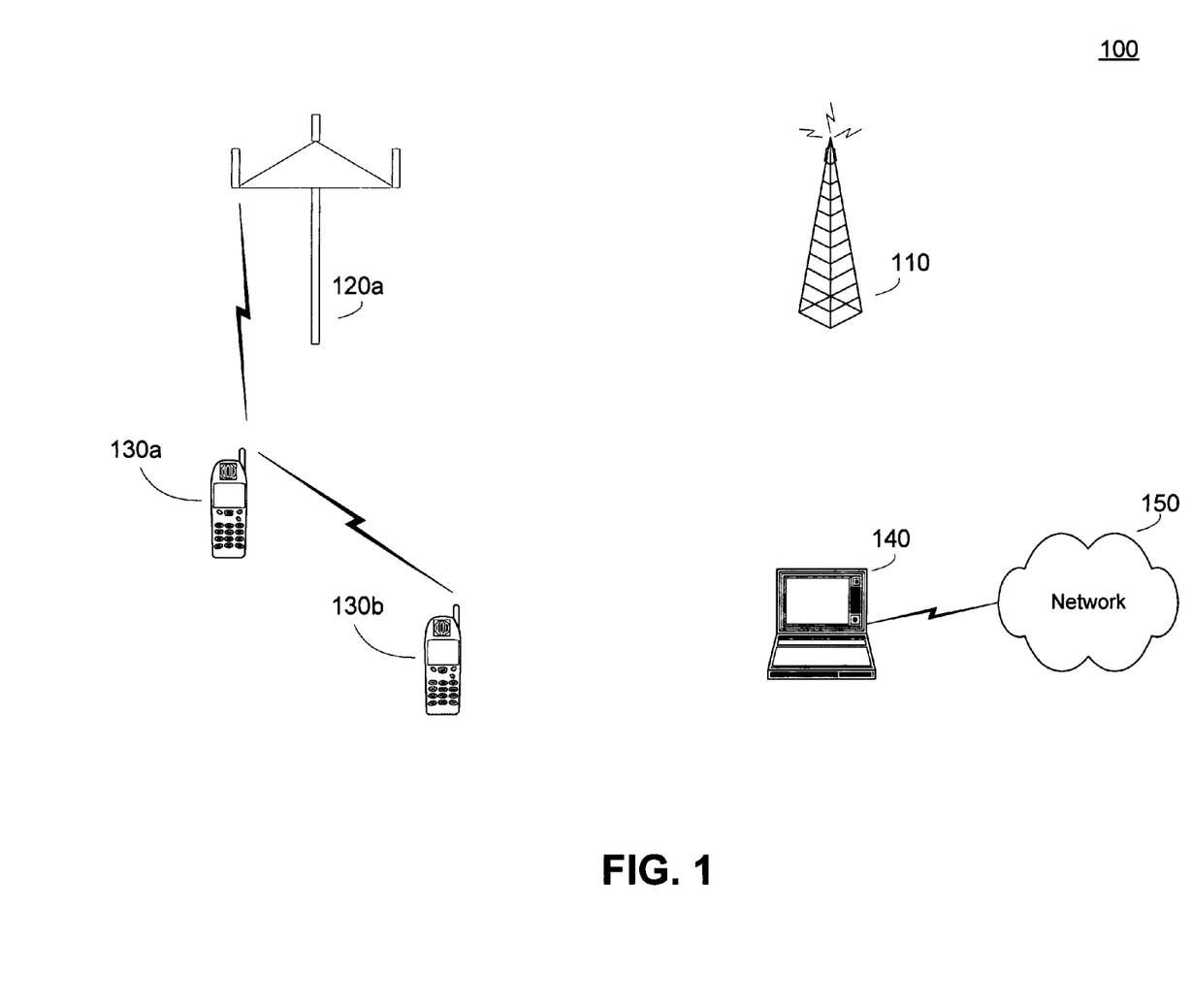
FIG. 1 is a simplified functional block diagram of an embodiment of a wireless communication system.

FIG. 1 is a simplified functional block diagram of an embodiment of an environment 100 supporting one or more communication systems that can implement SOQAM communications. The environment 100 illustrates various communication links that can each implement SOQAM.

A broadcast system 110 can represent, for example, broadcast communications that are typically unitary in direction, such as television or radio. In such a system, the broadcast system 110 can configured the information as a SOQAM signal and broadcast it across a coverage area that may include one or more receivers configured to receive and recover the information.

Additionally, a bidirectional communication system 120 can implement SOQAM communications across one or both communication directions. The bidirectional communication system 120 can be, for example, a wireless communication system that is coupled to a wired network (not shown). The bidirectional communication system 120 can be, for example, a wireless telephone system and can communicate with one or more user terminals 130a and 130b within a defined coverage area.

The forward link between the system 120 and a user terminal 130a can implement SOQAM communications. The reverse link communications originating at a user terminal, for example 130a, can also implement SOQAM. In such a system, the forward link channels may occupy a first communication band while the reverse link communications occupy a second distinct communication band.

Other wireless communication systems may allow one user terminal 130a to communicate directly with another user terminal 130b, without the communications being relayed or otherwise connected using a stationary communication system. In such a communication system, one or both of the communications links can utilize SOQAM.

For example, in a communication system in which portable devices can communicate directly with each other, a first user terminal 130a can transmit information to a second user terminal 130b using SOQAM. The second user terminal 130b can recover the information and may also generate and transmit information using SOQAM. Both user terminals 130a and 130b may use the same communications band for transmitting and receiving, and may implement some type of collision avoidance technique.

SOQAM can also be implemented in wireless and wired portions of a communication system. For example, a communication station 140 can be configured to operate over one or more wireless communication systems, including wirelessly receiving signals from the broadcast communication system 110 and wirelessly communicating with the bidirectional communication system 120. The communication station 140 may also be coupled to a network 150 using a wired communication link. The communication station 140 may use SOQAM over the wired communication ink to communicate information with the network 150.

Therefore, it is evident that SOQAM has application in any number of communication systems. SOQAM can be implemented to support wireless communications or can be implemented to support wired communications. The various communication systems illustrated in FIG. 1 may each use a compatible form of SOQAM or may implement distinct embodiments of SOQAM. For example, the various communication systems may implement different carrier frequencies or pulse repetition rates. Additionally, some communication systems may implement binary signaling on each of the in-phase and quadrature channels, while other communication systems may implement higher order modulation, where each of the I and Q channels supports m-ary signaling. If m=4 for each of the I and Q channels of a SOQAM communication system, the constellation has the ability to support up to 16 different states.

Figure 2:
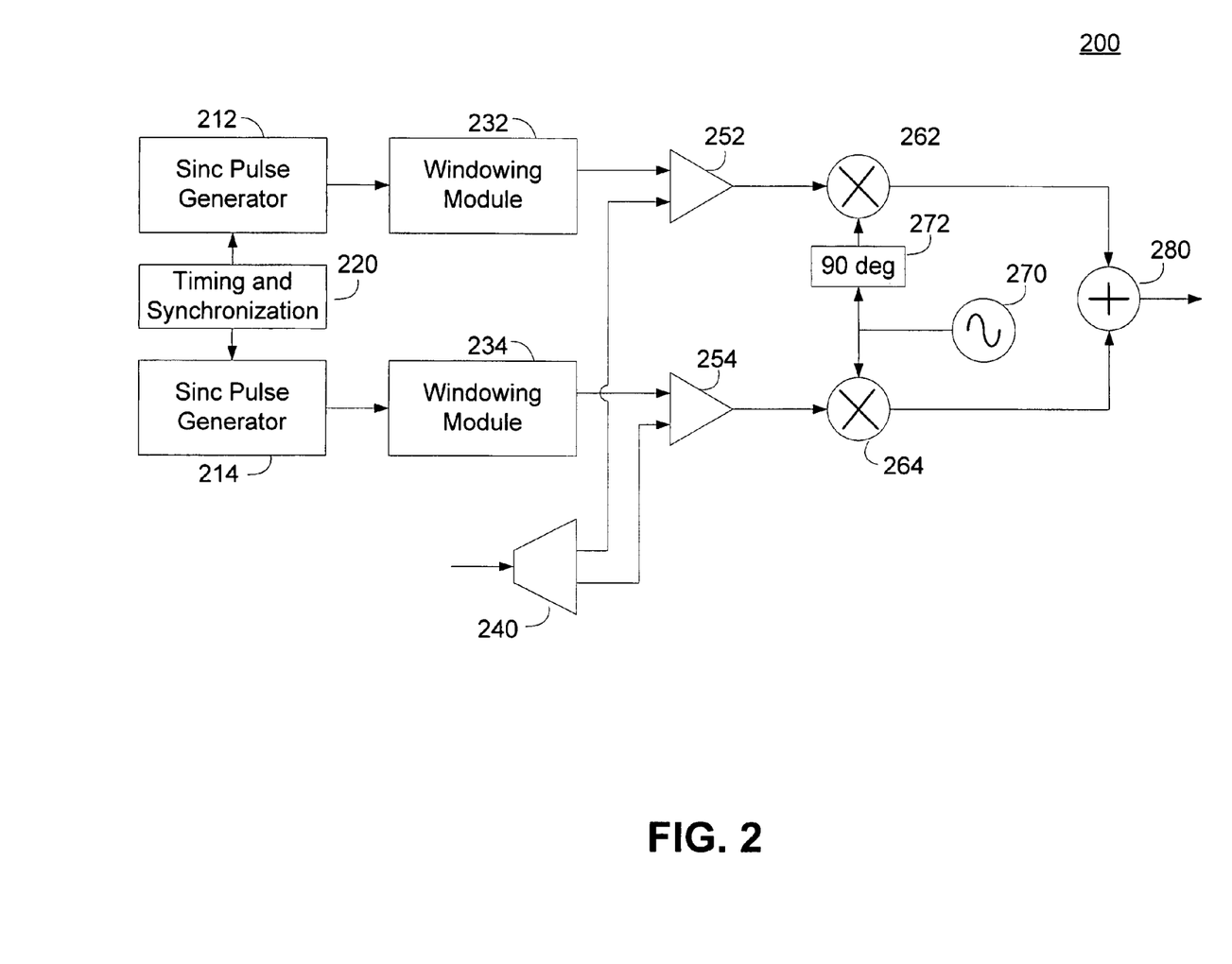
FIG. 2 is a simplified functional block diagram of an embodiment of a transmitter.

FIG. 2 is a simplified functional block diagram of an embodiment of a transmitter 200 that can be configured for SOQAM communications. The transmitter 200 can be implemented, for example, in any of the communication devices illustrated in FIG. 1. For example, the transmitter 200 can be implemented within the user terminals 130a and 130b or the broadcast system 110 of FIG. 1.

The transmitter 200 can include in-phase (I) and quadrature (Q) signal paths that are combined at the output of the transmitter 200. The transmitter 200 quadrature signal path can include a first sinc pulse generator 212 configured to generate a sinc pulse ((sin x)/x). The output of the first sinc pulse generator 212 can be coupled to a first windowing module 232 that operates to truncate the Q sinc pulses and perform the window function on the sinc pulse. The output of the first windowing module 232 can be coupled to a first multiplier 252 that can be configured to antipodal amplitude modulate the quadrature sinc pulses.

A data stream can be shared between the I and Q signal paths. For example, a multiplexer 240 can receive a data stream and can be configured to alternately assign bits to either the I or Q signal paths. In other embodiments, the I and Q information can be from distinct data paths or data sources (not shown).

The first multiplier 252 can be configured, for example, to multiply the sinc pulse by +1 if the data bit is a one and by −1 if the data bit is a zero. The output of the first multiplier 252 can be coupled to an upconverter that can include a first mixer 262 configure to upconvert the quadrature sinc pulses to a desired operating frequency. The output of the first mixer 262 can be coupled to a first input of a signal combiner 280.

The transmitter 200 in-phase signal path can be substantially the same as the quadrature signal path. A second sinc pulse generator 214 can be configured to generate sinc pulses for the in-phase signal path. A timing and synchronization module 220 can be configured to synchronize the timing of the I and Q sinc pulses. In one embodiment, the timing and synchronization module 220 can be configured to maintain substantially a predetermined time offset between the pulses of the I and Q channels. For example, the pulses on the in-phase signal path can be offset from the pulses of the Q signal path by approximately one half of a pulse repetition period.

The output of the second sinc pulse generator 214 can be coupled to a second windowing module 234 that can be configured to provide substantially the same window function response provided by the first windowing module 232. The output of the second windowing module 234 can be coupled to a second multiplier 254. The second multiplier 254 can be configured to antipodal amplitude modulate the in-phase sinc pulses based on the in-phase data.

The output of the second multiplier 254 can be coupled to the upconverter that also includes a second mixer 264 that can be configured to upconvert the modulated in-phase sinc pulses to a desired operating frequency, that is typically the same operating frequency used by the quadrature signal path.

In the embodiment shown in FIG. 2, a Local Oscillator (LO) 270 can be tuned to the desired operating frequency and supplied as an LO signal to both the first and second mixers 262 and 264. The LO signal that is coupled to the first mixer 262 can be phase offset by substantially ninety degrees using a phase shifter 272. The phase shifter 272 can be used to maintain the quadrature relationship between the two signal paths.

The output of the first mixer 262 can be maintained to be in quadrature with the output of the second mixer 264. The output of the second mixer 264 can be coupled to a second input of the signal combiner 280. In one embodiment, the signal combiner 280 can be configured to sum the signals output from the first and second mixer 262 and 264. The output of the signal combiner 280 can represent the transmitter 200 output signal.

The first and second sinc pulse generators 212 and 214 typically do not typically generate ideal sinc pulses, because an ideal sinc pulse has an infinite duration. Instead, the first and second sinc pulse generators 212 and 214 can each generate sinc pulses having a predetermined duration. The first and second sinc pulse generators 212 and 214 can be configured to generate sinc pulses that are longer in duration than a truncated duration that results from a subsequent windowing function. If the first and second sinc pulse generators 212 and 214 are able to generate sinc pulses each having a duration that is greater than a truncated sinc pulse duration, the transmitter 200 operates substantially as if the first and second sinc pulse generators 212 and 214 have the ability to generate ideal sinc pulses. Alternatively, the sinc pulse generators 212 and 214 can be configured to generate truncated sinc pulses that are substantially the same duration as results when the pulse is multiplied by the window function.

The first and second sinc pulse generators 212 and 214 can also be configured to generate pulse trains or sequences that occur at a predetermined repetition period. In one embodiment, the pulse repetition period can be adjusted such that the approximate center of a successive sinc pulse occurs substantially at a null of a previous sinc pulse. However, in order to maintain orthogonality of the pulses, the position of successive pulses may be slightly offset from the nulls. Thus, the outputs of the first and second sinc pulse generators 212 and 214 may not be orthogonal, but multiplying each pulse of the pulse train by the window function may result in a pulse train of substantially orthogonal pulses. In another embodiment, the pulse repetition period may be adjusted such that the approximate center of a successive truncated sinc pulse occurs substantially at a null of a previous truncated sinc pulse, where the sinc pulses are truncated using a windowing function.

The first and second windowing modules 232 and 234 can be configured to each operate as a time domain window function that is applied to the respective sinc pulse generator output signals. The sinc pulses are multiplied by the time domain window function provided by the first and second windowing modules 232 and 234. The window function can be selected to smoothly truncate the sinc pulses. The length of the truncated sinc pulse can be selected to trade-off the spectral roll off and the amount of signal processing required by a corresponding receiver.

In one embodiment, each of the windowing modules 232 and 234 can be configured to provide a Kaiser-Bessel time domain window function. The truncated sinc pulse, and the corresponding spectral response, can be adjusted by adjusting the beta function of the Kaiser-Bessel window function. A higher beta value can result in lower spectral sidelobes. However, the width of a main lobe transition increases with increasing beta value. The Kaiser-Bessel window function can be adjusted, for example, to generate a truncated sinc pulse that is substantially a multiple number of bit periods in duration. For example, the truncated sinc pulse can be substantially 32 times the bit period in duration, 16 times the bit period in duration, 8 times the bit period in duration, 4 times the bit period in duration, or some other multiple of bit period that does not need to be a power or factor of two or an integer multiple of the bit period. Using a truncation length that is an integer multiple of the bit period may simplify signal processing.

The spectral efficiency of the resultant waveform can approach 2 bits per hertz. However, the peak to average ratio of the resultant SOQAM waveform increases with increasing pulse length. In the embodiment in which the duration of the truncated sinc pulse is approximately 32 times the bit period, the peak to average ratio is approximately 3.6 dB. In the embodiment where the duration of the truncated sinc pulse is approximately 4 times the bit period, and the time offset between the I and Q channels is substantially one half of a bit period, the peak to average ratio is approximately 0.65 dB.

Figure 3A:
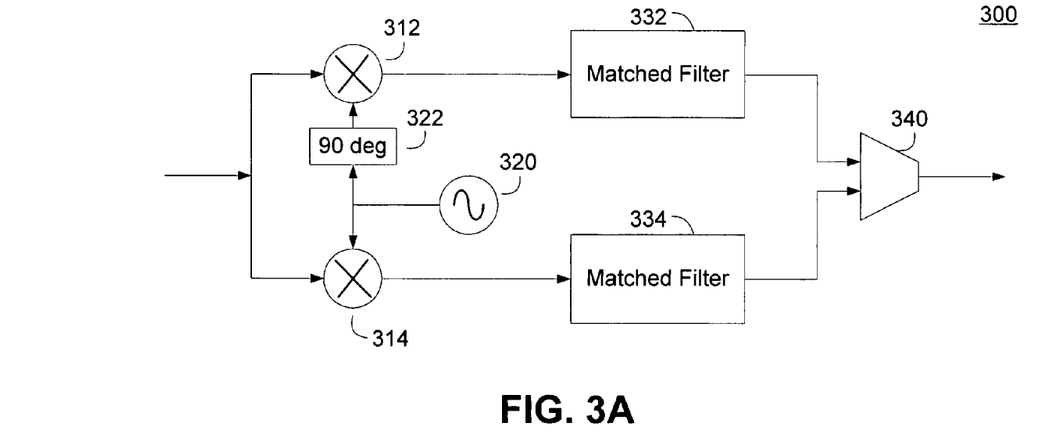
FIG. 3A-3B are simplified functional block diagrams of embodiments of a receiver.
Figure 3B:
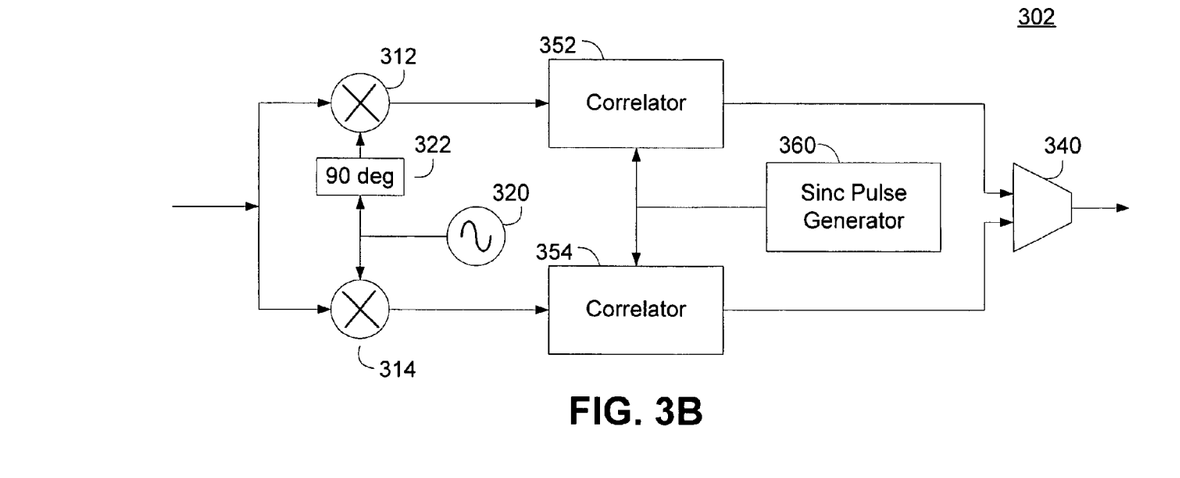

FIGS. 3A-3B are simplified functional block diagrams of embodiments of SOQAM receivers. Each of the receiver embodiments can be used to recover SOQAM data from the transmitter of FIG. 2. The receivers 300 and 302 are illustrated as direct conversion receivers for the sake of brevity. However, a receiver configured for SOQAM is not limited to a direct conversion implementation. The receiver 300 of FIG. 3A utilizes a matched filter to recover the data, while the receiver 302 of FIG. 3B uses a correlator to recover the data.

The receiver 300 of FIG. 3A includes an input coupling the received signal to the inputs of first and second mixers 312 and 314. The first and second mixers 312, and 314 can be configured to downconvert the quadrature and in-phase received signals, respectively. The output from a single LO can be coupled to LO inputs of each of the first and second mixers 312 and 314. The LO can be tuned to be substantially at the operating frequency of the received SOQAM signal. The LO signal can be coupled directly to the second mixer 314 and can be coupled to the first mixer 312 via a phase shifter 322 that can be configured to shift the phase of the LO signal by substantially 90 degrees. The output of the first mixer 312 can therefore be substantially in quadrature with the output of the second mixer 314.

The output of the first mixer 312 can be coupled to a first matched filter 332. The output of the second mixer 314 can be similarly coupled to a second matched filter 334. The first and second matched filters 332 and 334 can be matched to provide an impulse response similar to the truncated sinc pulse. The first matched filter 332 can be configured to provide a decision detector at a time instant that is offset relative to the decision detector in the second matched filter 334. The time offset between decision detection can be approximately the same as the time offset between the I and Q signal paths in the transmitter.

The output of the first matched filter 332 can be coupled to a first input of a demultiplexer 340. The output of the second matched filter 334 can be coupled to a second input of the demultiplexer 340. In an embodiment, the decision detection can be performed at the demultiplexer 340 when the signal is clocked to the output of the demultiplexer 340. The demultiplexer 340 can be configured to alternately select one of the I or Q signals for output, and thus can be configured to reverse a transmitter configuration that alternately selects data bits for the I and Q signals.

FIG. 3B is a simplified functional block diagram of another embodiment of a SOQAM receiver 302. The receiver 302 of FIG. 3B performs I and Q downconversion similar to the receiver embodiment of FIG. 3A. The received SOQAM signal is coupled to first and second mixers 312 and 314 driven by an output of a LO 320. The first mixer 312 is driven by the LO output phase shifted 90 degrees in a phase shifter 322, while the second mixer 314 is driven directly by the LO signal.

The output of the first mixer 312 can be coupled to a first correlator 352. The output of the second mixer 314 can be coupled to a second correlator 354. A sinc pulse generator 360 can be configured to generate a version of the truncated sinc pulse. for example, the sinc pulse generator 360 can generate a sinc pulse and can window the sinc pulse using a window function similar to that used in the transmitter. The output of the sinc pulse generator 360 can be coupled to the first and second correlators 352 and 354. The first and second correlators 352 and 354 can each be configured to correlate the received signal with the sinc pulse from the sinc pulse generator 360. The first correlator 360 can be configured to correlate the signal to obtain a decision at a time offset substantially equal to the I/Q time offset used in the transmitter.

The output of the first correlator 352 can be coupled to a first input of a demultiplexer 340 similarly, the output of the second correlator 354 can be coupled to the second input of the demultiplexer 340. The demultiplexer 340 can be configured to restore the data sequence from the I and Q signal paths.

Figure 4:
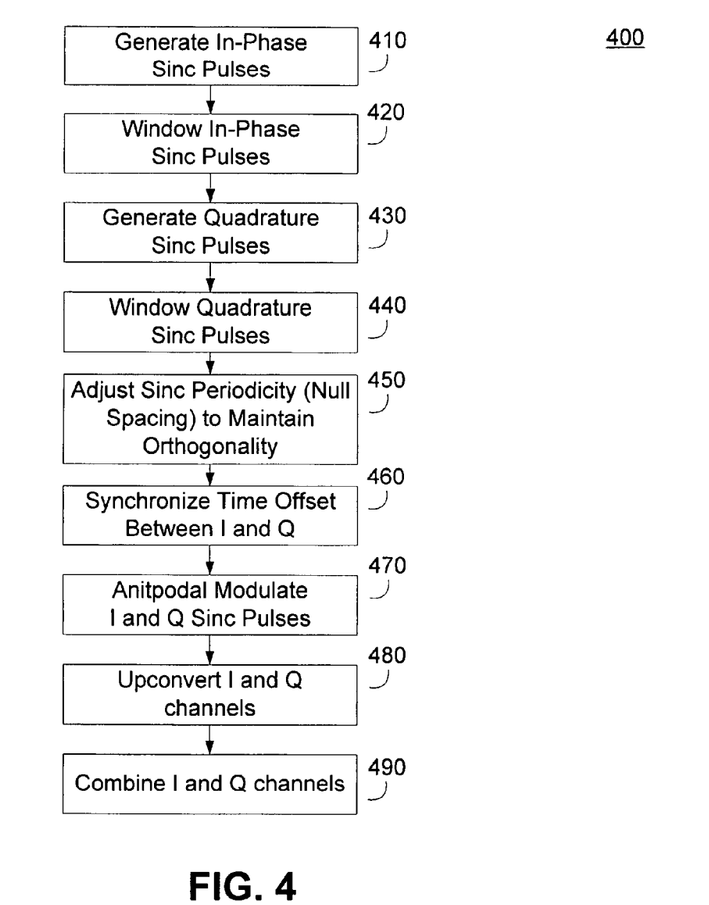
FIG. 4 is a simplified flowchart of an embodiment of a method of generating a SOQAM communication signal.

FIG. 4 is a simplified flowchart of a method 400 of generating SOQAM information. The method 400 can be performed, for example, by the transmitter of FIG. 2, when embodied in one of the devices shown in FIG. 1.

The method 400 begins at block 410 where the transmitter generates the in-phase sinc pulses. The transmitter can, for example, generate in-phase sinc pulses that have a duration that is longer than the expected duration of a truncated sinc pulse. The transmitter can generate the sinc pulses with a pulse repetition rate that provides substantially the center of a pulse at approximately the null of a previous pulse.

After generating the in-phase sinc pulses, the transmitter proceeds to block 420 and windows, or otherwise filters the in-phase sinc pulses using a predetermined window function. The predetermined window function can shape the sinc pulses to a desired duration and spectral response. In one embodiment, the window function is a Kaiser-Bessel window function having a desired duration or length and beta value. The beta value of the Kaiser-Bessel window function can be selected to achieve a desired side lobe level and main lobe width for the spectrum of the truncated sinc pulse. The sinc pulse can be multiplied by the window function to achieve the desired truncated in-phase sinc pulse.

The transmitter can proceed generate a pulse train for the quadrature channel in a similar fashion. At block 430, the transmitter can generate a sinc pulse train having a pulse repetition period that allows substantially a center of a pulse to occur at approximately the null of a previous pulse.

The transmitter can proceed to block 440 and windows, or otherwise filters, the sinc pulse train to generate a truncated quadrature sinc pulse train. Each sinc pulse in the pulse train can be multiplied by a time domain window function having a predetermined length and shape. The transmitter typically applies substantially the same window function that is applied to the in-phase sinc pulses. For example, the transmitter can multiply the quadrature sinc pulse train with a Kaiser-Bessel window function having substantially the same length and beta value as used in the window function of the in-phase pulses.

After generating the truncated sinc pulses for the in-phase and quadrature signal paths, the transmitter can proceed to block 450 and adjust the null spacing of the sinc pulses in order to maintain orthogonality of the truncated and windowed sinc pulses. The transmitter can, for example, vary the null spacing (or periodicity) of the generated sinc pulses. The transmitter can configure the null spacing of the sinc pulses with knowledge of the truncation length and window function. Thus, the sinc pulse generators may be configured to generate the sinc pulses having the desired null spacing and the transmitter need not monitor and adjust the null spacing of the sinc pulses. Alternatively, the transmitter can modify the timing of the truncated sinc pulses to maintain orthogonality of the pulses. The timing of the truncated sinc pulses may be slightly modified due to the application of the window function. To maintain substantially the center of a truncated sinc pulse at approximately the null of the previous pulse, the transmitter may modify the pulse repetition period of the sinc pulse generators. Maintaining orthogonality of truncated sinc pulses substantially eliminates inter-symbol interference, and allows the Bit Error Rate performance at a matched filter receiver to be substantially the same as that for ideal Offset QPSK.

After adjusting the null spacing of the sinc pulses or the pulse repetition periods to maintain orthogonality, the transmitter can proceed to block 460 and synchronize the time offset between the I and Q truncated sinc pulses. The time offset between I and Q sinc pulses can be set to a predetermined value. For example, the time offset can correspond to substantially one half a data bit period, corresponding to one half of the pulse repetition period.

After synchronizing the I and Q truncated sinc pulses, the transmitter can proceed to block 470 to modulate the I and Q sinc pulses with respective I and Q data. The manner in which the sinc pulses are modulated can be determined based at least in part on the order of the modulation. That is, for QAM, the I and Q sinc pulses may each have one of two binary values, while fro 16-QAM, each of the I and Q sinc pulses may have one of four different values.

In one embodiment, the transmitter can be configured for QAM and the data can antipodal amplitude modulate the I and Q sinc pulses. For example, the data stream can alternately be assigned to the I and Q signal paths. The sinc pulse can be multiplied by +1 if the modulating data bit or symbol is a one and can be multiplied by a −1 if the modulating data bit or symbol is a zero.

After modulating the I and Q pulses, the transmitter proceeds to block 480 and can upconvert the I and Q baseband signals to I and Q RF signals. The transmitter an implement a single conversion frequency conversion as shown in the embodiment of FIG. 2, or can perform upconversion in a plurality of upconversion stages.

After upconverting the I and Q channels, the transmitter can proceed to block 490 and combine the I and Q channels. In one embodiment, the transmitter can sum the I and Q channels.

Figure 5A:
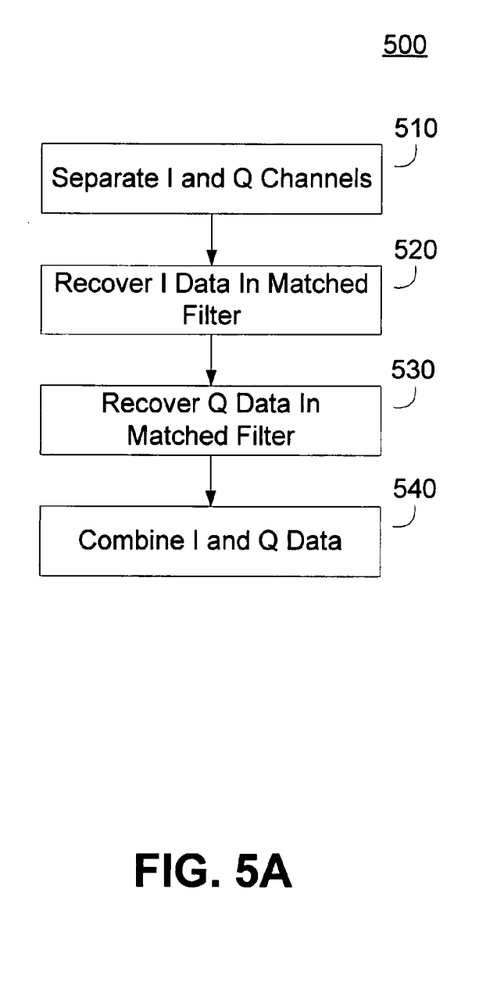
FIGS. 5A-5B are simplified flowcharts of embodiments of methods of receiving a SOQAM communication signal.
Figure 5B:
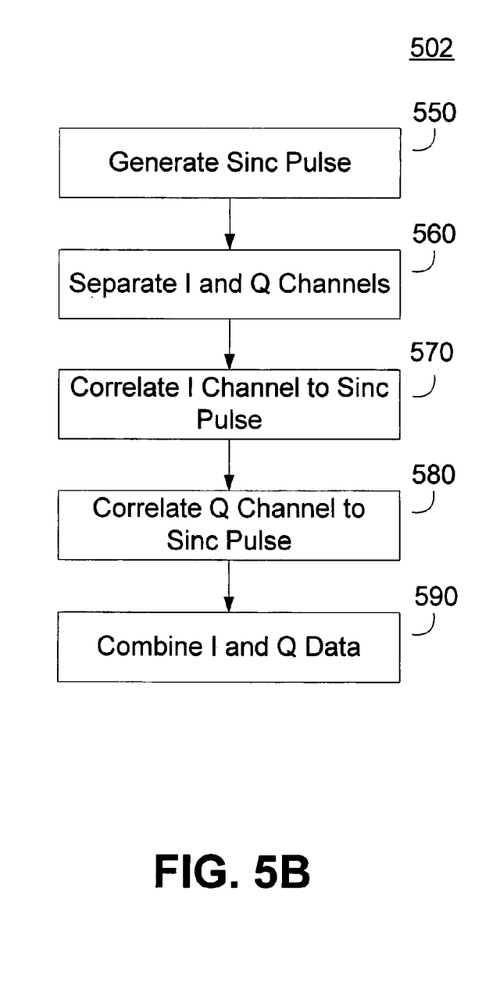

FIGS. 5A and 5B are simplified flowcharts of embodiments of methods 500 and 502 for receiving SOQAM signals. The method 500 of FIG. 5A can be performed, for example, by the receiver of FIG. 3A and may be embodied in one or more of the devices shown in FIG. 1. Similarly, the method 502 of FIG. 5B may be performed by the receiver of FIG. 3B and may also be embodied in one or more of the devices of FIG. 1.

The method 500 shown in FIG. 5A begins at block 510 where the receiver initially separates the I and Q channels. The SOQAM signal is typically received as a composite quadrature signal over an RF channel. The receiver can separate the I and Q channels using a downconverters that are driven by LO signals in quadrature. For example, a first mixer can be driven with an in-phase LO signal and a second mixer can be driven by the same LO signal phase shifted by substantially 90 degrees. The outputs from the two mixers can represent quadrature baseband signals.

After separating the I and Q channels from the received composite SOQAM signal, the mixer can proceed to block 520 and recover the in-phase data or information by passing the in-phase signal though a matched filter. The matched filter can have substantially the same impulse response as that of the truncated sinc pulse used in generating the in-phase data.

Similarly, the receiver, in block 530, can recover the quadrature data or information by passing the quadrature signal through a matched filter. Typically, the matched filter for the in-phase signal has the same response as the matched filter used to recover the quadrature signal. Because the SOQAM signal can include a predetermined time offset between the I and Q channels, the receiver may determine the recovered I and Q data at different times, based on the time offset. For example, the quadrature channel may be time offset from the in-phase channel by an amount substantially equal to one half of the bit or symbol period. The decision made at the output of the in-phase matched filter may then be configured to occur approximately one half a bit or symbol period before the decision at the output of the quadrature matched filter.

After passing the signals through the matched filter, the receiver can proceed to block 540 and combine the recovered I and Q data. The operation of block 540 is optional, because the receiver can be configured to operate on the I and Q data independently. However, in the embodiment in which the I and Q data are alternately multiplexed from a single data stream the receiver can combine the recovered I and Q data, for example, by demultiplexing the two recovered data streams.

The method 502 of FIG. 5B begins with the receiver generating a sinc pulse. The receiver can, for example, generate a sinc pulse that is substantially the same as the truncated sinc pulse used in the transmitter. The receiver can, for example, generate the truncated sinc pulse in the same manner as used in the transmitter. The receiver can generate a sinc pulse having a duration longer than that of the truncated sinc pulse and can multiply the sinc pulse with a window function that is substantially identical to the window function used by the transmitter.

The receiver proceeds to block 560 and separates the I and Q channels from the received composite SOQAM signal. The receiver can separate the I and Q channels in a manner similar to that described in relation with FIG. 5A.

After separating the I and Q channels, the receiver can proceed to block 570 and correlate the I channel with the generated sinc pulse. The receiver can make a decision on the encoded data or symbol based on the results of the correlation. Similarly, the receiver, at block 580 can correlate the Q channel with the generated sinc pulse. The receiver can maintain the time offset between the I and Q channels such that the correlators do not inadvertently skew by a time offset by an amount that would be on the order of the time offset between the two channels.

After correlating the channels, the receiver is able to recover the separate I and Q data streams. The receiver can optionally proceed to block 590 to combine the two recovered data streams. As discussed earlier, the I and Q data may have been generated from a single data stream, and the receiver may reconstruct the data stream according to the reverse of the process used in the transmitter.

Methods of modulating data and apparatus for modulating the data according to SOQAM have been disclosed. The resultant signals are spectrally efficient, nearing two bits per hertz for quadrature data. Additionally, the spectrum and peak to average ratio can be easily modified by selecting the appropriate beta value of a Kaiser-Bessel window and a corresponding window length for truncating or otherwise shaping a sinc pulse train or sequence.

The steps of a method, process, or algorithm described in connection with the embodiments disclosed herein may be embodied directly in hardware, in a software module executed by a processor, or in a combination of the two. The various steps or acts in a method or process may be performed in the order shown, or may be performed in another order. Additionally, one or more process or method steps may be omitted or one or more process or method steps may be added to the methods and processes. An additional step, block, or action may be added in the beginning, end, or intervening existing elements of the methods and processes.

The above description of the disclosed embodiments is provided to enable any person of ordinary skill in the art to make or use the disclosure. Various modifications to these embodiments will be readily apparent to those of ordinary skill in the art, and the generic principles defined herein may be applied to other embodiments without departing from the spirit or scope of the disclosure. Thus, the disclosure is not intended to be limited to the embodiments shown herein but is to be accorded the widest scope consistent with the principles and novel features disclosed herein.

What is claimed is:

1. A method of modulating data, the method comprising:
generating a first sinc pulse sequence with a first hardware based generator;
generating a second sinc pulse sequence time offset from the first sinc pulse sequence by a predetermined time offset, with a second hardware based generator;
multiplying each sinc pulse in the first sinc pulse sequence by a first windowing function to generate a first truncated sinc pulse sequence;
multiplying each sinc pulse in the second sinc pulse sequence by a second windowing function to generate a second truncated sinc pulse sequence;
modulating the first truncated sinc pulse sequence with in-phase data;
modulating the second truncated sinc pulse sequence with quadrature data;
upconverting the modulated first truncated sinc pulse sequence to an operating frequency;
upconverting the modulated second truncated pulse sequence to the operating frequency and substantially in quadrature to the modulated first sinc pulse sequence at the operating frequency; and
combining the modulated first sinc pulse sequence at the operating frequency with the modulated second sinc pulse sequence at the operating frequency.

2. The method of claim 1, wherein the first sinc pulse sequence comprises:
a first sinc pulse; and
a second sinc pulse having a center that is positioned at approximately a null of the first sinc pulse.

3. The method of claim 1, wherein the first sinc pulse sequence comprises a plurality of substantially orthogonal sinc pulses.

4. The method of claim 1, wherein the predetermined time offset comprises substantially one half of a pulse repetition period.

5. The method of claim 1, wherein the first windowing function and the second windowing function have substantially the same time domain response.

6. The method of claim 1, wherein the first windowing function comprises a Kaiser-Bessel windowing function.

7. The method of claim 1, wherein the first windowing function comprises a Kaiser-Bessel windowing function having a beta value selected to provide a predetermined sidelobe level.

8. The method of claim 1, wherein the first windowing function has a predetermined length.

9. The method of claim 1, wherein the first windowing function has a length that is at least eight bit periods in duration.

10. The method of claim 1, wherein the first windowing function has a length that is at least 16 bit periods in duration.

11. The method of claim 1, wherein modulating the first truncated sinc pulse sequence with in-phase data comprises antipodal amplitude modulating each sinc pulse in the truncated sinc pulse sequence with a distinct in-phase data symbol.

12. The method of claim 1, wherein modulating the first truncated sinc pulse sequence with in-phase data comprises amplitude modulating each sinc pulse in the truncated sinc pulse sequence to one of n predetermined levels, where n is greater than two.

13. The method of claim 1, further comprising generating the in-phase and quadrature data by alternately selecting symbols from a single symbol stream.

14. A method of modulating data, the method comprising:
generating a first sinc pulse sequence with a first hardware based generator;

generating a second sinc pulse sequence time offset from the first sinc pulse sequence by a predetermined time offset, with a second hardware based generator;

multiplying each sinc pulse in the first sinc pulse sequence by a Kaiser-Bessel window function to generate a first truncated sinc pulse sequence;

adjusting a null spacing of the first truncated sinc pulse sequence such that each truncated sinc pulse is substantially orthogonal to a previous truncated sinc pulse;

multiplying each sinc pulse in the second sinc pulse sequence by the Kaiser-Bessel windowing function to generate a second truncated sinc pulse sequence;

adjusting a null spacing of the second truncated sinc pulse sequence such that each truncated sinc pulse is substantially orthogonal to a previous truncated sinc pulse;

amplitude modulating the first truncated sinc pulse sequence based on in-phase data;

amplitude modulating the second truncated sinc pulse sequence based on quadrature data;

upconverting the modulated first truncated sinc pulse sequence to an operating frequency;

upconverting the modulated second truncated pulse sequence to the operating frequency and substantially in quadrature to the modulated first sinc pulse sequence at the operating frequency; and summing the modulated first sinc pulse sequence at the operating frequency with the modulated second sinc pulse sequence at the operating frequency.

15. A method of receiving modulated data, the method comprising:

receiving a composite signal having in-phase and quadrature signal components;

separating, with hardware based mixers, the in-phase signal component from the quadrature signal component;

recovering in-phase data using a first matched filter having a response matched to a truncated sinc pulse windowed by a predetermined window function; and recovering quadrature data using a second matched filter having the response matched to the truncated sinc pulse windowed by the predetermined window function, wherein the first match filter recovers the in-phase data and second matched filter recovers the quadrature data at a time offset of the in-phase and quadrature signal components.

16. The method of claim 15, wherein the truncated sinc pulse comprises a sinc pulse truncated to substantially an integer multiple of data bit periods.

17. The method of claim 15, wherein the window function comprises a Kaiser-Bessel window function.

18. An apparatus for generating a modulated signal; the apparatus comprising:

a first sinc pulse generator configured to generate a first sequence of sinc pulses;

a second sinc pulse generator configured to generate a second sequence of sinc pulses;

a first windowing module coupled to the first sinc pulse generator and configured to apply a first window function to the first sequence of sinc pulses to generate a first sequence of truncated sinc pulses;

a second windowing module coupled to the second sinc pulse generator and configured to apply a second window function to the second sequence of sinc pulses to generate a second sequence of truncated sinc pulses;

a timing module coupled to the first and second sinc pulse generators and configured to adjust a null spacing of the sinc pulses such that a center of a first truncated sinc pulse occurs at approximately a null of a previous truncated sinc pulse, and further configured to maintain a predetermined time offset between the first sequence of sinc pulses and the second sequence of sinc pulses;

a first amplitude modulator coupled to the first windowing module and configured to amplitude modulate each truncated sinc pulse of the first sequence of truncated sinc pulses;

a second amplitude modulator coupled to the second windowing module and configured to amplitude modulate each truncated sinc pulse of the second sequence of truncated sinc pulses;

an upconverter coupled to the first and second amplitude modulators and configured to upconvert to a desired operating frequency the amplitude modulated first sequence of truncated sinc pulses and upconvert to the desired operating frequency, and at a predetermined phase offset relative to the first sequence of truncated sinc pulses, the amplitude modulated second sequence of truncated sinc pulses; and a signal combiner coupled to the upconverter and configured to combine the amplitude modulated first sequence of truncated sinc pulses at the desired operating frequency with the amplitude modulated second sequence of truncated sinc pulses at the desired operating frequency and predetermined phase offset relative to the first sequence of truncated sinc pulses.

19. The apparatus of claim 18, wherein the first and second window functions comprise a Kaiser-Bessel window function.

20. The apparatus of claim 18, wherein the predetermined time offset comprises approximately one half of a data period.

21. The apparatus of claim 18, wherein the first and second amplitude modulators are each configured to antipodal amplitude modulate the respective truncated sinc pulses from the first and second truncated sinc pulse sequences.

22. The apparatus of claim 18, wherein the predetermined phase offset comprises substantially a 90 degree phase offset.

23. An apparatus for receiving a modulated signal; the apparatus comprising:

a downconverter configured to separate a received composite signal into in-phase and quadrature signal components;

a first matched filter coupled to the downconverter and configured to recover in-phase data from the in-phase signal component, the first matched filter configured to provide a response based on a truncated sinc pulse multiplied by a predetermined window function; and a second matched filter coupled to the downconverter and configured to recover quadrature data from the quadrature signal component, the second matched filter configured to provide a response based on the truncated sinc pulse multiplied by the predetermined window function, wherein the first matched filter comprises a first decision detector and the second matched filter comprises a second decision detector, and wherein the first decision detector and the second decision detector are configure to recover the in-phase data and quadrature data respectively at a time offset corresponding to a time offset of the in-phase and quadrature signal components.

24. The apparatus of claim 23, wherein the window function comprises a Kaiser-Bessel window function.

25. The apparatus of claim 23, wherein the truncated sinc pulse comprises a pulse having a length that is substantially an integer number of data periods.

* * * * *